United States Patent
Kim et al.

(10) Patent No.: US 10,607,553 B2
(45) Date of Patent: Mar. 31, 2020

(54) DISPLAY APPARATUS AND METHOD OF DRIVING THE SAME

(71) Applicant: Samsung Display Co., Ltd., Yongin-Si, Gyeonggi-Do (KR)

(72) Inventors: Jae-Hyun Kim, Seoul (KR); Yongjun Jang, Yongin-si (KR); Jaewoong Kang, Jeonju-si (KR); Taejin Kim, Bucheon-si (KR); Junyong Song, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 212 days.

(21) Appl. No.: 15/817,944

(22) Filed: Nov. 20, 2017

(65) Prior Publication Data

US 2018/0158423 A1    Jun. 7, 2018

(30) Foreign Application Priority Data

Dec. 5, 2016 (KR) .................. 10-2016-0164500

(51) Int. Cl.
*G06F 1/00* (2006.01)
*G09G 3/36* (2006.01)
(Continued)

(52) U.S. Cl.
CPC ......... *G09G 3/3607* (2013.01); *G02F 1/1368* (2013.01); *G02F 1/133528* (2013.01); *G02F 1/133555* (2013.01); *G02F 1/133621* (2013.01); *G02F 1/134309* (2013.01); *G09G 3/3208* (2013.01); *G09G 3/3611* (2013.01); *G09G 3/3677* (2013.01); *G09G 3/3688* (2013.01); *G02F 1/133617* (2013.01); *G02F 2001/133357* (2013.01); *G02F 2001/133614* (2013.01); *G02F 2001/134345* (2013.01); *G02F 2201/121* (2013.01); *G02F 2201/123* (2013.01); *G02F 2202/36* (2013.01); *G09G 2320/0242* (2013.01);
(Continued)

(58) Field of Classification Search
CPC ...... G09G 3/3208; G09G 3/3413; G06F 1/00; G02B 5/22
See application file for complete search history.

(56) References Cited

U.S. PATENT DOCUMENTS

2010/0013872 A1 *  1/2010  Masuda ............... G09G 3/3413
                                                            345/691
2010/0171733 A1 *  7/2010  Kobayashi ........... G09G 3/3208
                                                            345/211
(Continued)

FOREIGN PATENT DOCUMENTS

KR          101600492 B1     2/2016

*Primary Examiner* — Michael A Faragalla
(74) *Attorney, Agent, or Firm* — Cantor Colburn LLP

(57) ABSTRACT

A display apparatus includes an image data compensator. The image data compensator receives input image data, compensates for the input image data according to a temperature of a display panel to output first compensation image data in order to compensate for a luminance decrease of the display panel according to the temperature of the display panel, and compensates for the first compensation image data according to an efficiency and a life expectancy of a quantum dot to output second compensation image data in order to compensate for a luminance decrease of the display panel by the quantum dot.

20 Claims, 9 Drawing Sheets

(51) Int. Cl.
   *G02F 1/1343* (2006.01)
   *G02F 1/1368* (2006.01)
   *G02F 1/1335* (2006.01)
   *G09G 3/3208* (2016.01)
   *G02F 1/1333* (2006.01)

(52) U.S. Cl.
   CPC . *G09G 2320/041* (2013.01); *G09G 2320/045* (2013.01); *G09G 2320/0626* (2013.01); *G09G 2360/16* (2013.01)

(56) References Cited

U.S. PATENT DOCUMENTS

2010/0231136 A1* 9/2010 Reisenauer ........ H05B 33/0815
 315/276
2015/0212352 A1* 7/2015 Guo ................. G02F 1/133617
 349/71
2015/0286096 A1* 10/2015 Kim ........................ G02B 5/22
 349/65
2016/0217723 A1 7/2016 Kim et al.

* cited by examiner

DISPLAY APPARATUS AND METHOD OF DRIVING THE SAME

This application claims priority to Korean Patent Application No. 10-2016-0164500, filed on Dec. 5, 2016, and all the benefits accruing therefrom under 35 U.S.C. § 119, the content of which in its entirety is herein incorporated by reference.

BACKGROUND

1. Field

Exemplary embodiments of the invention relate to an image display, and more particularly to a display apparatus and a method of driving the display apparatus.

2. Description of the Related Art

A display apparatus generally includes a display panel and a display panel driving apparatus.

The display panel includes a gate line, a data line, and a pixel defined by the gate line and the data line.

The display panel driving apparatus includes a gate driving part, a data driving part and a timing controlling part. The gate driving part outputs a gate signal to the gate line, the data driving part outputs a data signal to the data line, and the timing controlling part controls timings of the gate driving part and the data driving part.

The display panel may be a quantum dot ("QD") display panel including a quantum dot. The quantum dot display panel includes a lower substrate, an upper substrate and a liquid crystal layer.

The lower substrate includes a first base substrate, a thin film transistor ("TFT") disposed on the first base substrate, and a pixel electrode electrically connected to a drain electrode of the TFT.

The upper substrate includes a second base substrate, a quantum dot layer disposed on the second base substrate and including the quantum dot, and a common electrode disposed on the quantum dot layer.

The liquid crystal layer is interposed between the lower substrate and the upper substrate, and includes a liquid crystal of which an arrangement is changed by an electric field between the pixel electrode to which a pixel voltage is applied and the common electrode to which a common voltage is applied.

The quantum dot layer may include a red quantum dot layer disposed in a first sub pixel area, a green quantum dot layer disposed in a second sub pixel area, and a transparent layer disposed in a third sub pixel area.

SUMMARY

Exemplary embodiments of the invention provide a display apparatus capable of improving display quality.

Exemplary embodiments of the invention also provide a method of driving the above-mentioned display apparatus.

According to an exemplary embodiment of the invention, a display apparatus includes a display panel, a gate driver, an image data compensator and a data driver. The display panel displays an image, and includes a quantum dot, a gate line and a data line. The gate driver outputs a gate signal to the gate line of the display panel. The image data compensator receives input image data, compensate for the input image data according to a temperature of the display panel, outputs first compensation image data in order to compensate for a luminance decrease of the display panel according to the temperature of the display panel, and compensate for the first compensation image data according to an efficiency and a life expectancy of the quantum dot to output second compensation image data in order to compensate for a luminance decrease of the display panel by the quantum dot. The data driver generates a data signal using the second compensation image data, and outputs the data signal to the data line of the display panel.

In an exemplary embodiment, the image data compensator may include a first memory which stores temperature compensation data according to the temperature of the display panel.

In an exemplary embodiment, the image data compensator may further include a second memory which stores a quantum dot compensation coefficient according to the efficiency and the life expectancy of the quantum dot.

In an exemplary embodiment, the image data compensator may further include a temperature compensating part which receives the input image data, compensates for the input image data using the temperature compensation data, and outputs the first compensation image data.

In an exemplary embodiment, the image data compensator may further include a quantum dot compensating part which receives the first compensation image data, compensates for the first compensation image data using the quantum dot compensation coefficient, and outputs the second compensation image data.

In an exemplary embodiment, the quantum dot compensation coefficient may include a red quantum dot compensation coefficient according to a life expectancy and an efficiency of a red quantum dot, and a green quantum dot compensation coefficient according to a life expectancy and an efficiency of a green quantum dot.

In an exemplary embodiment, the input image data may include red data, green data and blue data, the first compensation image data may include first compensation red data, first compensation green data and first compensation blue data, and the quantum dot compensating part may multiply the first compensation red data by the red quantum dot compensation coefficient to output second compensation red data of the second compensation image data, and may multiply the first compensation green data by the green quantum dot compensation coefficient to output second compensation green data of the second compensation image data.

In an exemplary embodiment, second compensation blue data of the second compensation image data may be the same as the first compensation blue data of the first compensation image data.

In an exemplary embodiment, the quantum dot compensating part may compensate for the first compensation image data further using a blue compensation coefficient to output the second compensation image data.

In an exemplary embodiment, the quantum dot compensation coefficient may include a red quantum dot compensation coefficient according to a life expectancy and an efficiency of a red quantum dot, and a green quantum dot compensation coefficient according to a life expectancy and an efficiency of a green quantum dot, the input image data may include red data, green data and blue data, the first compensation image data may include first compensation red data, first compensation green data and first compensation blue data, and when the luminance of the display panel is not greater than a reference luminance, the quantum dot compensating part may multiply the first compensation red data by the red quantum dot compensation coefficient to output second compensation red data of the second compensation image data, may multiply the first compensation green data by the green quantum dot compensation coefficient to output second compensation green data of the second compensation image data and may multiply the first compensation blue data by the blue compensation coefficient to output second compensation blue data of the second compensation image data.

In an exemplary embodiment, the display apparatus may further include a temperature sensor which senses the temperature of the display panel.

In an exemplary embodiment, the temperature sensor may contact a rear surface of the display panel.

In an exemplary embodiment, the display apparatus may further include a first printed circuit board ("PCB") on which the temperature sensor is disposed, and a second PCB which is connected between the display panel and the first PCB, and is a flexible PCB. A data driving integrated circuit of the data driver may be disposed on the second PCB.

In an exemplary embodiment, the display panel may include a lower substrate, an upper substrate and a liquid crystal layer. The lower substrate may include a first base substrate including a first sub pixel area, a second sub pixel area and a third sub pixel area, a thin film transistor disposed on the first base substrate and including a gate electrode, a source electrode and a drain electrode, and a pixel electrode electrically connected to the drain electrode of the thin film transistor. The upper substrate may include a second base substrate facing the first base substrate, a quantum dot layer disposed on the second base substrate and including the quantum dot, and a common electrode disposed on the quantum dot layer. The liquid crystal layer may be interposed between the lower substrate and the upper substrate.

In an exemplary embodiment, the quantum dot layer may include a red quantum dot layer disposed in the first sub pixel area, a green quantum dot layer disposed in the second sub pixel area, and a transparent layer disposed in the third sub pixel area.

In an exemplary embodiment, the display apparatus may further include a light source part which outputs a blue light to the display panel.

In an exemplary embodiment, the display apparatus may further include a polarizing layer disposed on a rear surface of the first base substrate, a transmitting and reflecting layer disposed on the quantum dot layer, a planarizing layer disposed on the transmitting and reflecting layer, and a wire grid pattern disposed on the planarizing layer and having a plurality of protrusion portions.

According to an exemplary embodiment of the invention, a method of driving a display apparatus includes compensating for input image data according to a temperature of a display panel to output first compensation image data in order to compensate for a luminance decrease of the display panel according to the temperature of the display panel, the display panel comprising a quantum dot, a gate line and a data line, compensating for the first compensation image data according to an efficiency and a life expectancy of the quantum dot to output second compensation image data in order to compensate for a luminance decrease of the display panel by the quantum dot, generating a data signal using the second compensation image data, and outputting the data signal to the data line of the display panel, and outputting a gate signal to the gate line of the display panel.

In an exemplary embodiment, the compensating for the first compensation image data to output the second compensation image data may include multiplying first compensation red data of the first compensation image data by red quantum dot compensation coefficient to output second compensation red data of the second compensation image data, multiplying first compensation green data of the first compensation image data by green quantum dot compensation coefficient to output second compensation green data of the second compensation image data, and outputting first compensation blue data of the first compensation image data as second compensation blue data of the second compensation image data.

In an exemplary embodiment, when the luminance of the display panel is not greater than a reference luminance, the compensating for the first compensation image data to output the second compensation image data may include multiplying first compensation red data of the first compensation image data by red quantum dot compensation coefficient to output second compensation red data of the second compensation image data, multiplying first compensation green data of the first compensation image data by green quantum dot compensation coefficient to output second compensation green data of the second compensation image data, and multiplying first compensation blue data of the first compensation image data by blue compensation coefficient to output second compensation blue data of the second compensation image data.

According to the invention, a luminance decrease of a display panel by a red quantum dot layer may be compensated using a red quantum dot compensation coefficient and a luminance decrease of the display panel by a green quantum dot layer may be compensated using a green quantum dot compensation coefficient. Therefore, luminance of a first sub pixel area in which the red quantum dot layer is disposed, a second sub pixel area in which the green quantum dot layer is disposed, and a third sub pixel area in which a transparent layer is disposed may be equalized. In addition, a white balance of a red displayed in the first sub pixel area, a green displayed in the second sub pixel area and a blue displayed in the third sub pixel area may be adjusted. Thus, display quality of a display apparatus may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
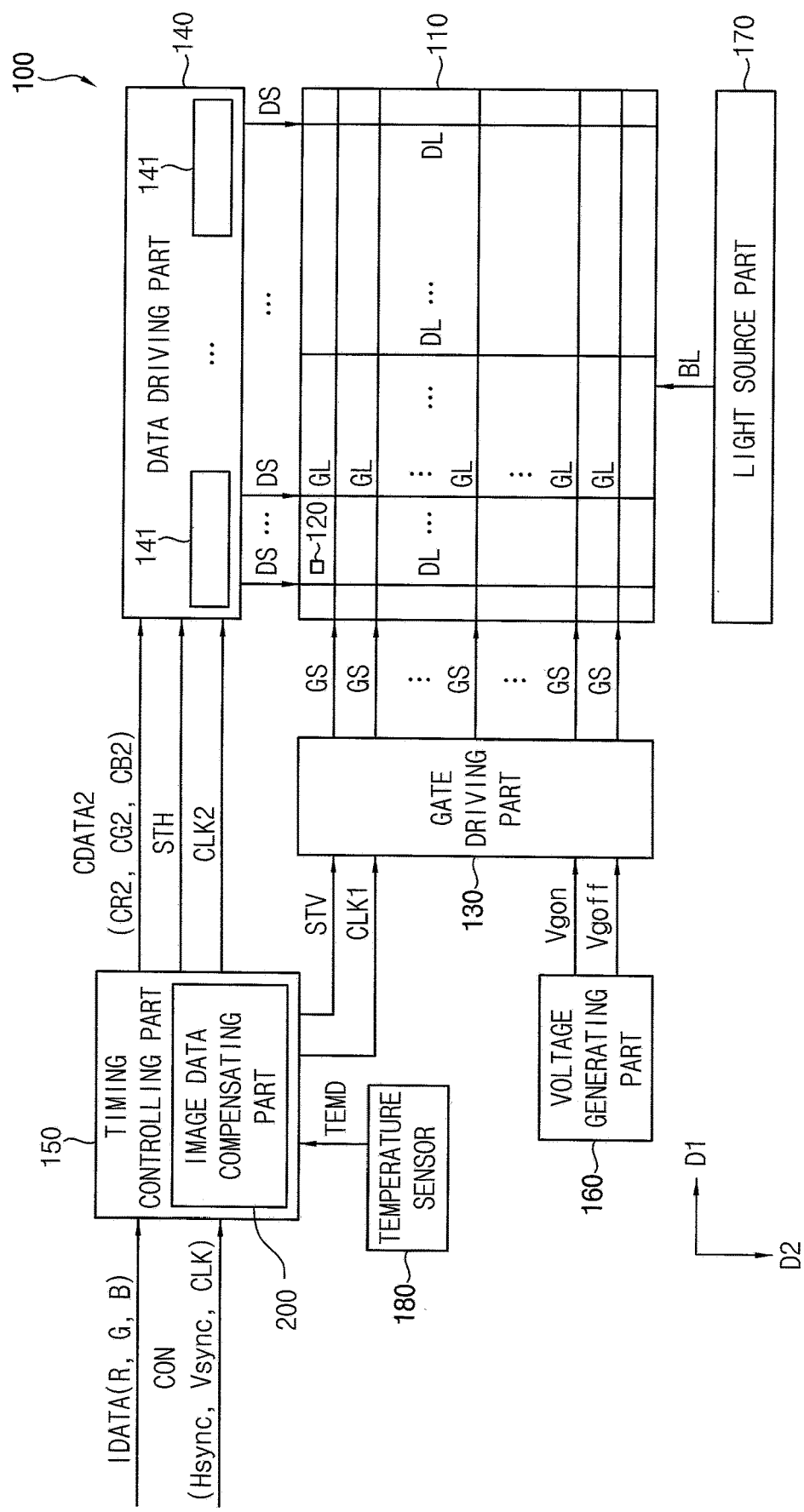
FIG. 1 is a block diagram illustrating a display apparatus according to an exemplary embodiment of the invention.

Hereinafter, the invention will be explained in detail with reference to the accompanying drawings. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a block diagram illustrating a display apparatus according to an exemplary embodiment of the invention.

Referring to FIG. 1, the display apparatus 100 according to the illustrated exemplary embodiment includes a display panel 110, a gate driving part 130, a data driving part 140, a timing controlling part 150, a voltage generating part 160, a light source part 170 and a temperature sensor 180.

The display panel 110 receives a data signal DS from the data driving part 140 to display an image. The display panel 110 includes gate lines GL, data lines DL and pixels 120. The gate lines GL extend in a first direction D1 and are arranged in a second direction D2 substantially perpendicular to the first direction D1. The data lines DL extend in the second direction D2 and are arranged in the first direction D1. In an exemplary embodiment, the first direction D1 may be parallel to a long side of the display panel 110, and the second direction D2 may be parallel to a short side of the display panel 110, for example. However, the invention is not limited thereto, and the first direction D1 may be parallel to a short side of the display panel 110, and the second direction D2 may be parallel to a long side of the display panel 110. In an exemplary embodiment, the display panel 110 may be a liquid crystal display ("LCD") panel including a liquid crystal, for example. In an exemplary embodiment, the display panel 110 may be a quantum dot display panel including a quantum dot, for example.

Figure 2:
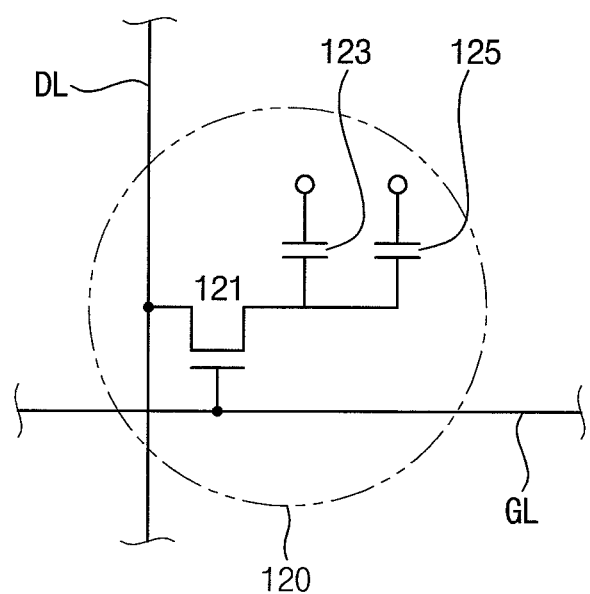
FIG. 2 is a circuit diagram illustrating a pixel of FIG. 1.

FIG. 2 is a circuit diagram illustrating the pixel 120 of FIG. 1.

Referring to FIGS. 1 and 2, each of the pixels 120 is defined by each of the gate lines GL and each of the data lines DL. In an exemplary embodiment, the pixel 120 may include a thin film transistor ("TFT") 121 electrically connected to the gate line GL and the data line DL, a liquid crystal capacitor 123 and a storage capacitor 125 connected to the TFT 121. Thus, the display panel 110 may be an LCD panel.

Referring back to FIG. 1, the gate driving part 130, the data driving part 140 and the timing controlling part 150 may be defined as a display panel driving apparatus for driving the display panel 110.

The gate driving part 130 generates gate signals GS in response to a vertical start signal STV and a first clock signal CLK1 provided from the timing controlling part 150, and outputs the gate signals GS to the gate lines GL, respectively. The gate driving part 130 may receive a gate on voltage Vgon and a gate off voltage Vgoff from the voltage generating part 160, and may generate the gate signal GS using the gate on voltage Vgon and the gate off voltage Vgoff. In an exemplary embodiment, the gate driving part 130 may include a gate driver or a gate driving circuit, for example.

The data driving part 140 receives second compensation image data CDATA2 from the timing controlling part 150, generates the data signal DS using the second compensation image data CDATA2, and outputs the data signal DS to the data line DL in response to a horizontal start signal STH and a second clock signal CLK2 provided from the timing controlling part 150. The data driving part 140 may include a plurality of data driving integrated circuits ("ICs") 141 generating the data signal DS and outputting the data signal DS to the data line DL. In an exemplary embodiment, the data driving part 140 may include a data driver or a data driving circuit, for example.

The timing controlling part 150 receives input image data IDATA and a control signal CON from an outside. In an exemplary embodiment, the input image data IDATA may include red data R, green data G and blue data B. However, the invention is not limited thereto, and the input image data IDATA may include various other color data. The control signal CON may include a horizontal synchronous signal Hsync, a vertical synchronous signal Vsync and a clock signal CLK. The timing controlling part 150 generates the horizontal start signal STH using the horizontal synchronous signal Hsync and outputs the horizontal start signal STH to the data driving part 140. In addition, the timing controlling part 150 generates the vertical start signal STV using the vertical synchronous signal Vsync and outputs the vertical start signal STV to the gate driving part 130. In addition, the timing controlling part 150 generates the first clock signal CLK1 and the second clock signal CLK2 using the clock signal CLK, outputs the first clock signal CLK1 to the gate driving part 130, and outputs the second clock signal CLK2 to the data driving part 140. In an exemplary embodiment, the timing controlling part 150 may include a timing controller or a timing controlling circuit, for example.

The timing controlling part 150 includes an image data compensating part 200. The image data compensating part 200 compensates for the input image data IDATA according to a temperature of the display panel 110, and an efficiency and a life expectancy of a quantum dot included in the display panel 110, and outputs the second compensation image data CDATA2. In an exemplary embodiment, the image data compensating part 200 may include an image data compensator, for example.

The voltage generating part 160 generates the gate on voltage Vgon and the gate off voltage Vgoff and outputs the gate on voltage Vgon and the gate off voltage Vgoff to the gate driving part 130.

The light source part 170 outputs a blue light BL to the display panel 110. In an exemplary embodiment, the light source part 170 may include a blue light emitting diode generating the blue light BL, and a light guide plate which guides the blue light BL to the display panel 110, for example.

The temperature sensor 180 senses the temperature of the display panel 110. The temperature sensor 180 outputs temperature data TEMD indicating the temperature of the display panel 110 to the timing controlling part 150.

Figure 3:
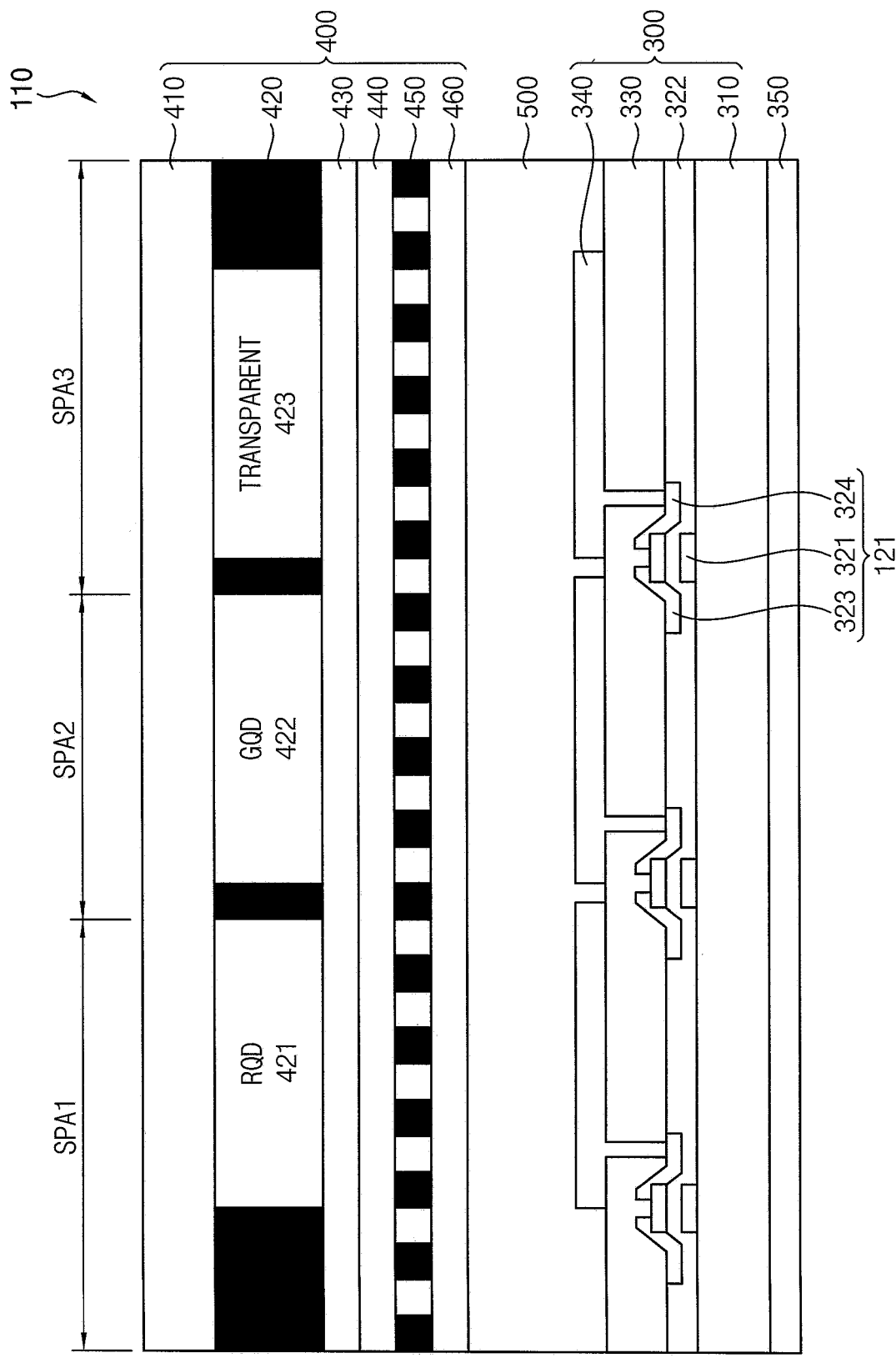
FIG. 3 is a cross-sectional view illustrating a display panel of FIG. 1.

FIG. 3 is a cross-sectional view illustrating the display panel 110 of FIG. 1.

Referring to FIGS. 1 and 3, the display panel 110 includes a lower substrate 300, an upper substrate 400 and a liquid crystal layer 500. In an exemplary embodiment, the display panel 110 may include the quantum dot, and the display panel 110 may be a photo luminescence display panel, for example.

The lower substrate 300 includes a first base substrate 310, the TFT 121, a gate insulating layer 322, an organic insulating layer 330 and a pixel electrode 340.

The first base substrate 310 includes a first sub pixel area SPA1 in which a first sub pixel is disposed, a second sub pixel area SPA2 in which a second sub pixel is disposed, and a third sub pixel area SPA3 in which a third sub pixel is disposed. In an exemplary embodiment, the first base substrate 310 may be a glass substrate, for example. In an alternative exemplary embodiment, the first base substrate 310 may be a plastic substrate, for example.

The TFT 121 is disposed in each of the first sub pixel area SPA1, the second sub pixel area SPA2 and the third sub pixel area SPA3. The TFT 121 is disposed on a front surface of the first base substrate 310, and includes a gate electrode 321, the gate insulating layer 322 covering the gate electrode 321, a source electrode 323, and a drain electrode 324 spaced apart from the source electrode 323.

The organic insulating layer 330 covers the TFT 121.

The pixel electrode 340 is disposed on the organic insulating layer 330, and is electrically connected to the drain electrode 324 of the TFT 121 through a contact hole defined through the organic insulating layer 330.

The lower substrate 300 may further include a polarizing layer 350. The polarizing layer 350 is disposed on a rear surface of the first base substrate 310. The polarizing layer 350 polarizes the blue light BL from the light source part 170 (refer to FIG. 1).

The second substrate 400 includes a second base substrate 410, a quantum dot layer 420, a transmitting and reflecting layer 430, a planarizing layer 440, a wire grid pattern layer 450 and a common electrode 460.

The second base substrate 410 faces the first base substrate 310. In an exemplary embodiment, the second base substrate 410 may be a glass substrate, for example. In an alternative exemplary embodiment, the second base substrate 410 may be a plastic substrate, for example.

The quantum dot layer 420 includes a red quantum dot layer 421, a green quantum dot layer 422 and a transparent layer 423. The red quantum dot layer 421 is disposed in the first sub pixel area SPA1. The green quantum dot layer 422 is disposed in the second sub pixel area SPA2. The transparent layer 423 is disposed in the third sub pixel area SPA3. When the light source part 170 emits the blue light BL, the blue light BL is exited in the red quantum dot layer 421 and a red color is displayed in the first sub pixel area SPA1. In addition, the blue light BL is exited in the green quantum dot layer 422 and a green is displayed in the second sub pixel area SPA2. In addition, the blue light BL is transmitted in the transparent layer 423 and a blue color is displayed in the third sub pixel area SPA3.

The transmitting and reflecting layer 430 is disposed on the quantum dot layer 420. The transmitting and reflecting layer 430 transmits the blue light GL from the light source part 170, and reflects an external light from an outside.

The planarizing layer 440 is disposed on the transmitting and reflecting layer 430. The planarizing layer 440 planarizes the transmitting and reflecting layer 430 to form the wire grid pattern layer 450.

The wire grid pattern layer 450 is disposed on the planarizing layer 440. The wire grid pattern layer 450 may include a plurality of protrusion portions. The protrusion portions, which form a wire grid, are disposed in a regular interval, and have the same form as each other. In an exemplary embodiment, the protrusions may have a pitch of about 50 nanometers (nm) to about 150 nm, for example. The pitch refers to an addition of a width of the protrusion portion and a distance between adjacent protrusion portions. An air gap is defined between the adjacent protrusion portions of the wire grid pattern layer 450. An air may be included in the air gap.

The common electrode 460 is disposed on the wire grid pattern layer 450.

The liquid crystal layer 500 is interposed between the lower substrate 300 and the upper substrate 400. The liquid crystal layer 500 includes a liquid crystal of which an arrangement is changed by an electric field between the pixel electrode 340 of the lower substrate 300 and the common electrode 460 of the upper substrate 400.

Figure 4:
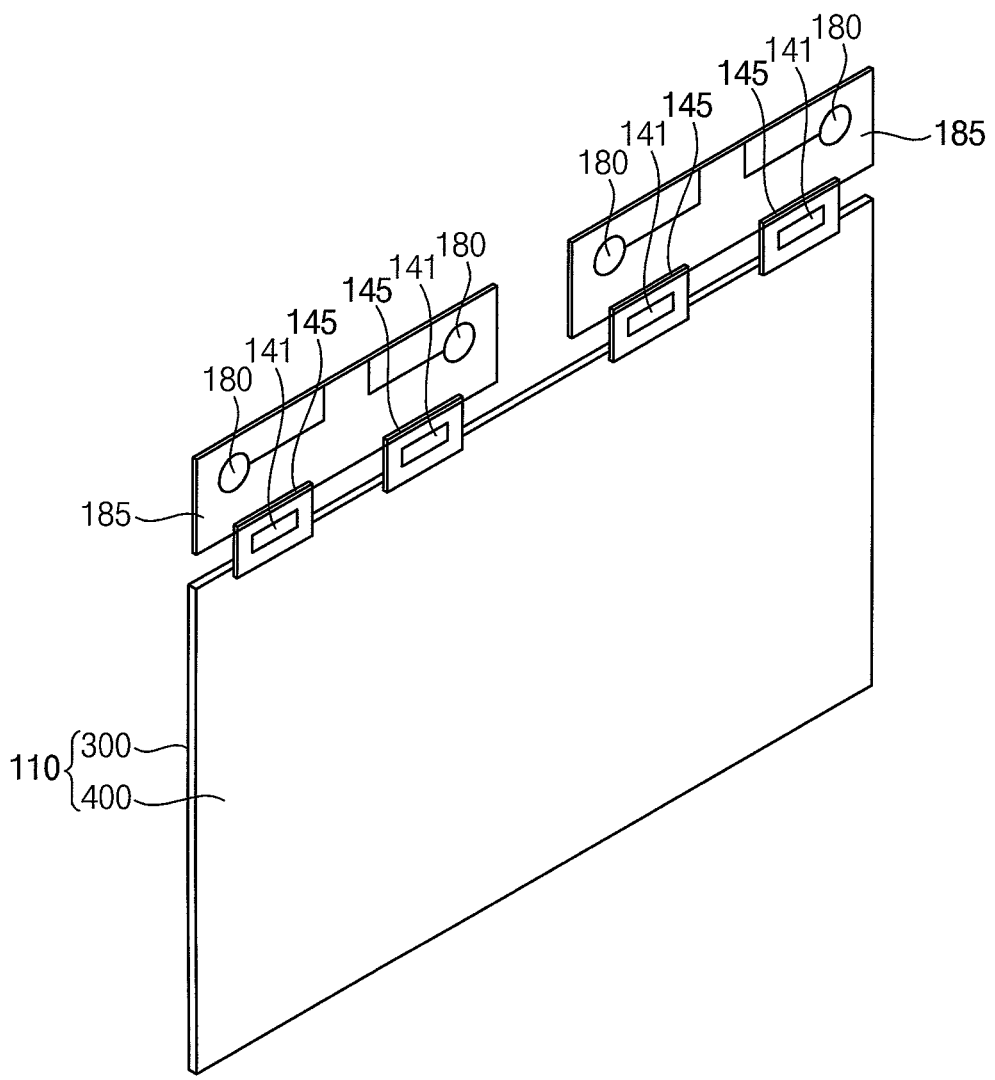
FIG. 4 is a perspective view illustrating the display panel, a data driving integrated circuit ("IC") and a temperature sensor of FIG. 1.
Figure 5:
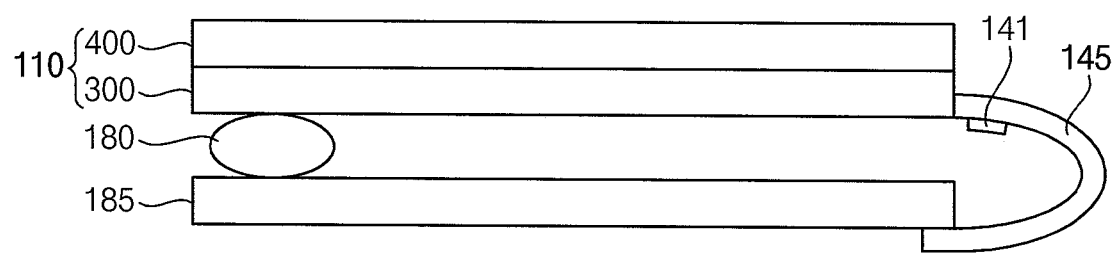
FIG. 5 is a side view illustrating the display panel, the data driving IC and the temperature sensor of FIG. 1.

FIG. 4 is a perspective view illustrating the display panel 110, the data driving IC 141 and the temperature sensor 180 of FIG. 1. FIG. 5 is a side view illustrating the display panel 110, the data driving IC 141 and the temperature sensor 180 of FIG. 1.

Referring to FIGS. 1, 4 and 5, the display apparatus 100 may further include a first printed circuit board ("PCB") 185 and a second PCB 145.

The display apparatus 100 may include N (N is a natural number) first PCB 185. The temperature sensor 180 is disposed on the first PCB 185. The temperature sensor 180 may be disposed on a rear surface of the first PCB 185. In an exemplary embodiment, two temperature sensors 180 may be disposed on the first PCB 185.

The display apparatus 100 may include M (M is a natural number) second PCB 145. The data driving IC 141 is disposed on the second PCB 145. The data driving IC 141 may be disposed on a front surface or a rear surface of the second PCB 145. The second PCB 145 is disposed between the display panel 110 and the first PCB 185. Specifically, the second PCB 145 is connected between the display panel 110 and the first PCB 185.

The second PCB 145 may be a flexible PCB. Thus, the second PCB 145 may be bent toward a rear surface of the display panel 110. Therefore, the temperature sensor 180 disposed on the rear surface of the first PCB 185 which is connected to the second PCB 145 may contact with the display panel 110. The temperature sensor 180 senses the temperature of the display panel 110 by making contact with the display panel 110.

Figure 6:
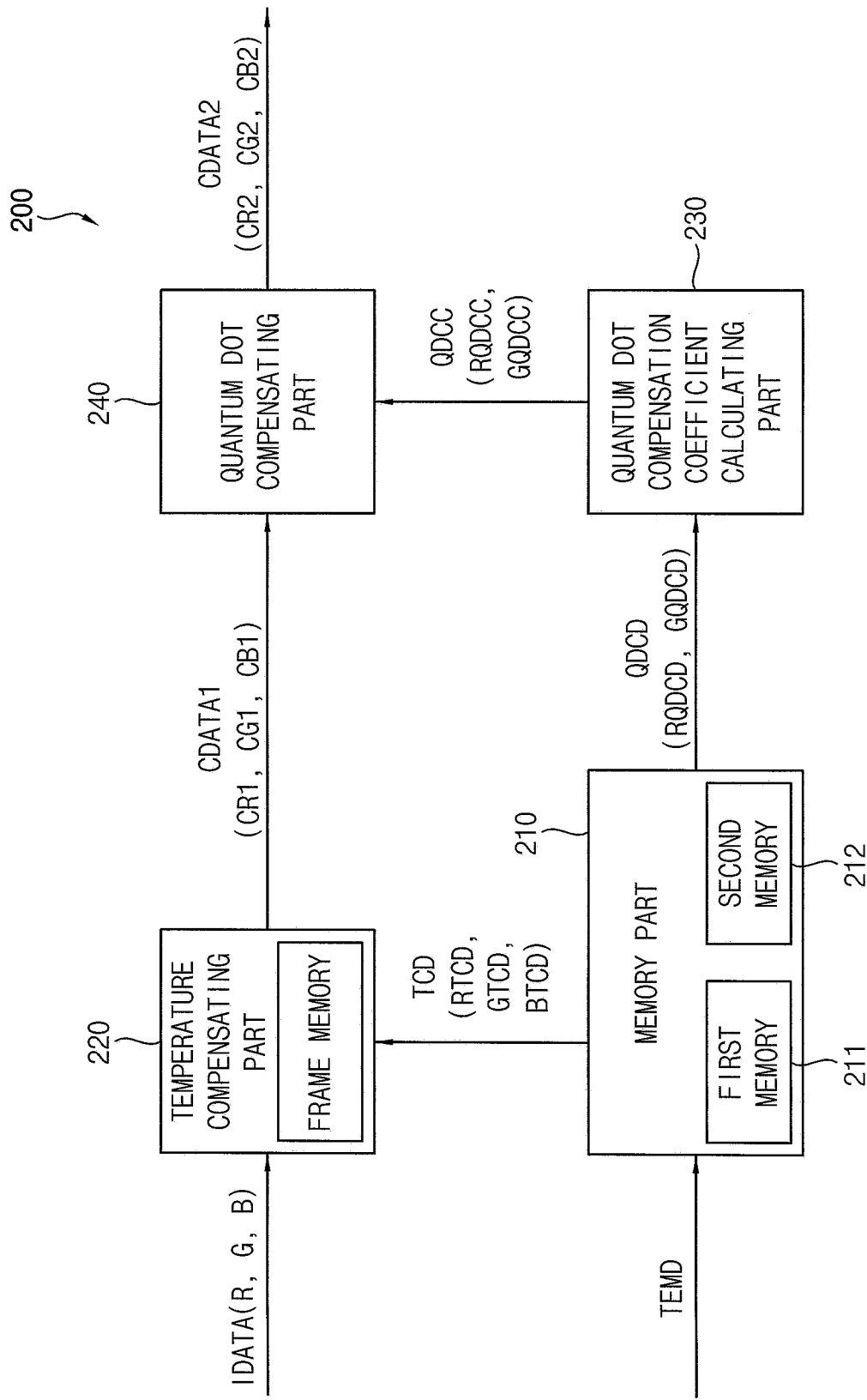
FIG. 6 is a block diagram illustrating an image data compensating part of FIG. 1.

FIG. 6 is a block diagram illustrating the image data compensating part 200 of FIG. 1.

Referring to FIGS. 1, 3 and 6, the image data compensating part 200 includes a memory part 210, a temperature compensating part 220, a quantum dot compensation coefficient calculating part 230 and a quantum dot compensating part 240.

The memory part 210 includes a first memory 211 and a second memory 212.

The first memory 211 stores and outputs temperature compensation data TCD according to the temperature of the display panel 110. The temperature compensation data TCD may be a difference value between a target luminance of the display panel 110 and a real luminance of the display panel 110 according to the temperature of the display panel 110. Specifically, the temperature compensation data TCD may be data for compensating for the real luminance of the display panel 110 according to the temperature of the display panel 110 to the target luminance of the display panel 110.

In order to calculate the real luminance of the display panel 110 according to the temperature of the display panel 110, luminance values of a red pixel, a green pixel and a blue pixel are measured with respect to P (P is an integer) temperature. In addition, the luminance values of the red pixel, the green pixel and the blue pixel are measured with respect to Q (Q is a natural number) grayscale value. In an exemplary embodiment, the luminance values of the red pixel, the green pixel and the blue pixel may be measured with respect to about −20 degrees to about 120 degrees in an interval of about 10 degrees, for example. In an exemplary embodiment, the luminance values of the red pixel, the green pixel and the blue pixel may be measured with respect to about 32 grayscale value to 1024 grayscale value in an interval of 32 grayscale value, for example. Here, the red pixel corresponds to the first sub pixel area SPA1 in which the red quantum dot layer 421 is disposed, the green pixel corresponds to the second sub pixel area SPA2 in which the green quantum dot layer 422 is disposed, the blue pixel corresponds to the third sub pixel area SPA3 in which the transparent layer 423 is disposed.

Thus, the temperature compensation data TCD may include red temperature compensation data RTCD, green temperature compensation data GTCD and blue temperature compensation data BTCD.

The memory part 210 may receive the temperature data TEMD. The memory part 210 may output, to the temperature compensating part 220, the temperature compensation data TCD according to the temperature of the display panel 110 indicated by the temperature data TEMD.

The second memory 212 stores and outputs quantum dot compensation data QDCD according to the efficiency and life expectancy of the quantum dot in the quantum dot layer 420.

An efficiency and a life expectancy of a red quantum dot in the red quantum dot layer 421 and an efficiency and a life expectancy of a green quantum dot in the green quantum dot layer 422 decrease according to an increase of a driving time of the display panel 110. When the efficiency and life expectancy of the red quantum dot and the efficiency and life expectancy of the green quantum dot decrease, the real luminance of the display panel 110 decreases.

The quantum dot compensation data QDCD may be a difference value between the target luminance of the display panel 110 and the real luminance of the display panel 110 according to the efficiency and life expectancy of the quantum dot. Specifically, the quantum dot compensation data QDCD may be data for compensating for the real luminance of the display panel 110 according to the efficiency and life expectancy of the quantum dot to the target luminance of the display panel 110.

Since the display panel 110 includes the red quantum dot layer 421 and the green quantum dot layer 422, the quantum dot compensation data QDCD may include red quantum dot compensation data RQDCD according to the efficiency and life expectancy of the red quantum dot, and green quantum dot compensation data GQDCD according to the efficiency and life expectancy of the green quantum dot.

The temperature compensating part 220 receives the input image data IDATA. The input image data IDATA may include the red data R, the green data G and the blue data B. The temperature compensating part 220 may include a frame memory for storing the input image data IDATA.

The temperature compensating part 220 compensates for the input image data IDATA using the temperature compensation data TCD and outputs first compensation image data CDATA1. The first compensation image data CDATA1 may include first compensation red data CR1, first compensation green data CG1 and first compensation blue data CB1. Specifically, the temperature compensating part 220 applies the red temperature compensation data RTCD to the red data R and outputs the first compensation red data CR1. In addition, the temperature compensating part 220 applies the green temperature compensation data GTCD to the green data G and outputs the first compensation green data CG1. In addition, the temperature compensating part 220 applies the blue temperature compensation data BTCD to the blue data B and outputs the first compensation blue data CB1.

According to another exemplary embodiment, the temperature compensating part 220 may receive the temperature data TEMD. In this case, the temperature compensating part 220 may read, from the first memory 211 of the memory part 210, the temperature compensation data TCD according to the temperature of the display panel 110 indicted by the temperature data TEMD, may compensate for the input image data IDATA, and may output the first compensation image data CDATA1.

The quantum dot compensation coefficient calculating part 230 receives the quantum dot compensation data QDCD and outputs a quantum dot compensation coefficient QDCC. The quantum dot compensation data QDCD may be transferred from the memory part 210 to the quantum dot compensation coefficient calculating part 230 through an inter-interchanged circuit ("I2C") communication.

The quantum dot compensation coefficient calculating part 230 receives the red quantum dot compensation data RQDCD and outputs a red quantum dot compensation coefficient RQDCC. In addition, the quantum dot compensation coefficient calculating part 230 receives the green quantum dot compensation data GQDCD and outputs a green quantum dot compensation coefficient GQDCC. The red quantum dot compensation coefficient RQDCC may be a coefficient for compensating for the real luminance of the display panel 110 which is decreased by the efficiency and life expectancy of the red quantum dot in the red quantum dot layer 421 to the target luminance of the display panel 110. The green quantum dot compensation coefficient GQDCC may be a coefficient for compensating for the real luminance of the display panel 110 which is decreased by the efficiency and life expectancy of the green quantum dot in the green quantum dot layer 422 to the target luminance of the display panel 110.

The quantum dot compensation coefficient calculating part 230 may calculate the red quantum dot compensation coefficient RQDCC by determining the efficiency and life expectancy of the red quantum dot in the red quantum dot layer 421 based on the driving time of the display panel 110. In addition, the quantum dot compensation coefficient calculating part 230 may calculate the green quantum dot compensation coefficient GQDCC by determining the efficiency and life expectancy of the green quantum dot in the green quantum dot layer 422 based on the driving time of the display panel 110.

The quantum dot compensating part 240 compensates for the first compensation image data CDATA1 using the red quantum dot compensation coefficient RQDCC and the green quantum dot compensation coefficient GQDCC, and outputs the second compensation image data CDATA2. The second compensation image data CDATA2 may include second compensation red data CR2, second compensation green data CG2 and second compensation blue data CB2. Specifically, the quantum dot compensating part 240 may multiply the first compensation red data CR1 by the red quantum dot compensation coefficient RQDCC, and may output the second compensation red data CR2. In addition, the quantum dot compensating part 240 may multiply the first compensation green data CG1 by the green quantum dot compensation coefficient GQDCC, and may output the second compensation green data CG2. In addition, the quantum dot compensating part 240 may output the first compensation blue data CB1 as the second compensation blue data CB2. Thus, the second compensation blue data CB2 may be substantially the same as the first compensation blue data CB1.

Figure 7:
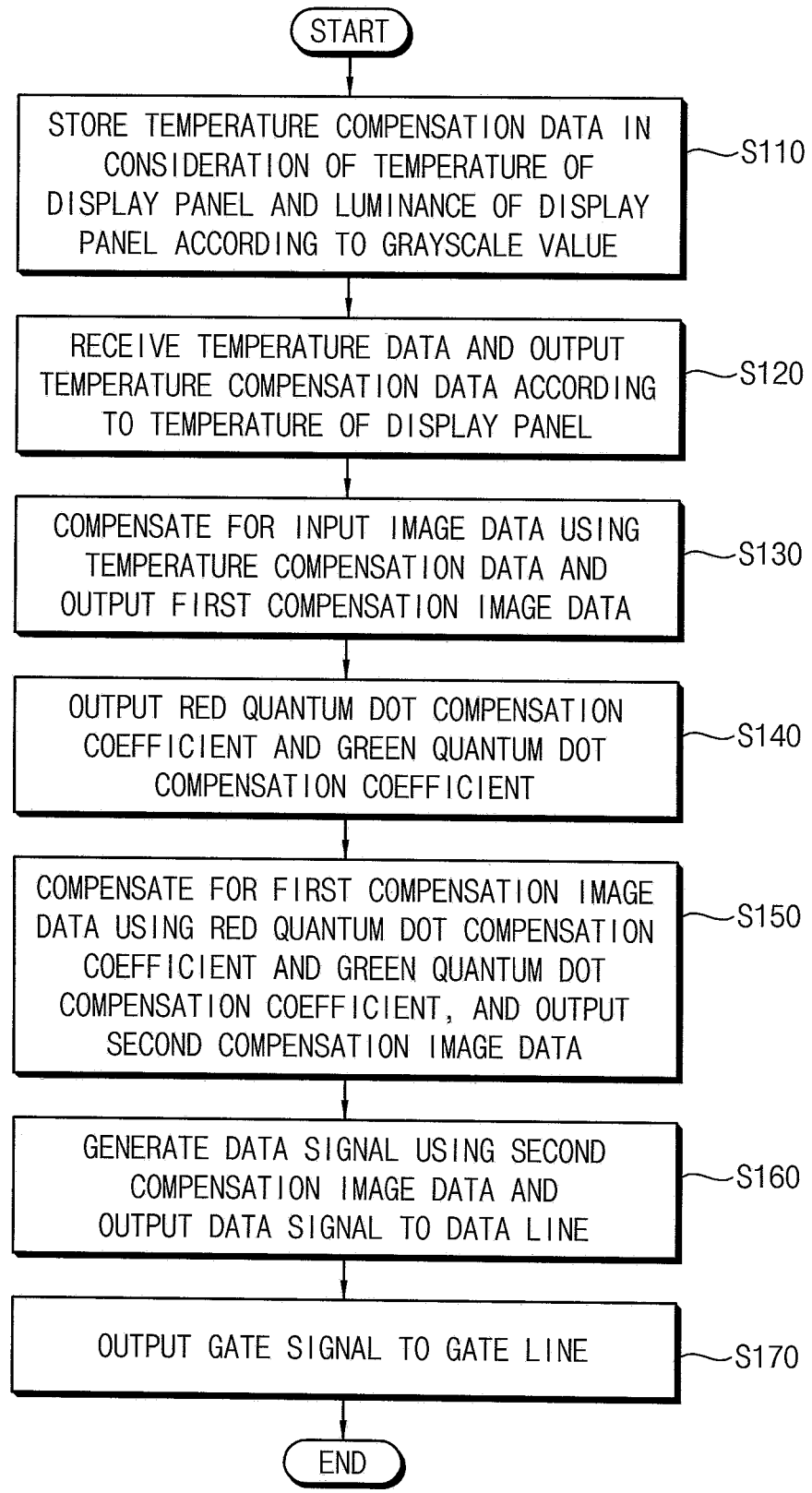
FIG. 7 is a flowchart illustrating a method of driving the display apparatus of FIG. 1.

FIG. 7 is a flowchart illustrating a method of driving the display apparatus 100 of FIG. 1.

Referring to FIGS. 1 to 7, the temperature compensation data TCD is stored in consideration of a luminance of the display panel 110 according to the temperature and a grayscale of the display panel 110 (operation S110).

Specifically, the first memory 211 stores and outputs the temperature compensation data TCD according to the temperature of the display panel 110. The temperature compensation data TCD may be the difference value between the target luminance of the display panel 110 and the real luminance of the display panel 110 according to the temperature of the display panel 110. The temperature compensation data TCD may be the data for compensating for the real luminance of the display panel 110 according to the temperature of the display panel 110 to the target luminance of the display panel 110.

In order to calculate the real luminance of the display panel 110 according to the temperature of the display panel 110, the luminance values of the red pixel, the green pixel and the blue pixel are measured with respect to the P (P is an integer) temperature. In addition, the luminance values of the red pixel, the green pixel and the blue pixel are measured with respect to the Q (Q is a natural number) grayscale value. In an exemplary embodiment, the luminance values of the red pixel, the green pixel and the blue pixel may be measured with respect to about −20 degrees to about 120 degrees in the interval of about 10 degrees, for example. In an exemplary embodiment, the luminance values of the red pixel, the green pixel and the blue pixel may be measured with respect to about 32 grayscale value to about 1024 grayscale value in the interval of 32 grayscale value, for example. Here, the red pixel corresponds to the first sub pixel area SPA1 in which the red quantum dot layer 421 is disposed, the green pixel corresponds to the second sub pixel area SPA2 in which the green quantum dot layer 422 is disposed, the blue pixel corresponds to the third sub pixel area SPA3 in which the transparent layer 423 is disposed.

Thus, the temperature compensation data TCD may include the red temperature compensation data RTCD, the green temperature compensation data GTCD and the blue temperature compensation data BTCD.

The temperature data TEMD is received and the temperature compensation data TCD according to the temperature of the display panel 110 is output (operation S120). Specifically, the memory part 210 may receive the temperature data TEMD. The memory part 210 may output, to the temperature compensating part 220, the temperature compensation data TCD according to the temperature of the display panel 110 indicated by the temperature data TEMD.

The input image data IDATA is compensated using the temperature compensation data TCD and the first compensation image data CDATA1 is output (operation S130).

Specifically, the temperature compensating part 220 receives the input image data IDATA. The input image data IDATA may include the red data R, the green data G and the blue data B. The temperature compensating part 220 may include the frame memory for storing the input image data IDATA.

The temperature compensating part 220 compensates for the input image data IDATA using the temperature compensation data TCD and outputs the first compensation image data CDATA1. The first compensation image data CDATA1 may include the first compensation red data CR1, the first compensation green data CG1 and the first compensation blue data CB1. Specifically, the temperature compensating part 220 applies the red temperature compensation data RTCD to the red data R and outputs the first compensation red data CR1. In addition, the temperature compensating part 220 applies the green temperature compensation data GTCD to the green data G and outputs the first compensation green data CG1. In addition, the temperature compensating part 220 applies the blue temperature compensation data BTCD to the blue data B and outputs the first compensation blue data CB1.

According to another exemplary embodiment, the temperature compensating part 220 may receive the temperature data TEMD. In this case, the temperature compensating part 220 may read, from the first memory 211 of the memory part 210, the temperature compensation data TCD according to the temperature of the display panel 110 indicted by the temperature data TEMD, may compensate for the input image data IDATA, and may output the first compensation image data CDATA1.

The red quantum dot compensation coefficient RQDCC and the green quantum dot compensation coefficient GQDCC are output (operation S140).

Specifically, the quantum dot compensation coefficient calculating part 230 receives the quantum dot compensation data QDCD and outputs the quantum dot compensation coefficient QDCC. In an exemplary embodiment, the quantum dot compensation data QDCD may be transferred from the memory part 210 to the quantum dot compensation coefficient calculating part 230 through an I2C communication, for example.

The quantum dot compensation coefficient calculating part 230 receives the red quantum dot compensation data RQDCD and outputs the red quantum dot compensation coefficient RQDCC. In addition, the quantum dot compensation coefficient calculating part 230 receives the green quantum dot compensation data GQDCD and outputs the green quantum dot compensation coefficient GQDCC. The red quantum dot compensation coefficient RQDCC may be the coefficient for compensating for the real luminance of the display panel 110 which is decreased by the efficiency and life expectancy of the red quantum dot in the red quantum dot layer 421 to the target luminance of the display panel 110. The green quantum dot compensation coefficient GQDCC may be the coefficient for compensating for the real luminance of the display panel 110 which is decreased by the efficiency and life expectancy of the green quantum dot in the green quantum dot layer 422 to the target luminance of the display panel 110.

The quantum dot compensation coefficient calculating part 230 may calculate the red quantum dot compensation coefficient RQDCC by determining the efficiency and life expectancy of the red quantum dot in the red quantum dot layer 421 based on the driving time of the display panel 110. In addition, the quantum dot compensation coefficient calculating part 230 may calculate the green quantum dot compensation coefficient GQDCC by determining the efficiency and life expectancy of the green quantum dot in the green quantum dot layer 422 based on the driving time of the display panel 110.

The first compensation image data CDATA1 is compensated using the red quantum dot compensation coefficient RQDCC and the green quantum dot compensation coefficient GQDCC, and the second compensation image data CDATA2 is output (operation S150). Specifically, the quantum dot compensating part 240 compensates for the first compensation image data CDATA1 using the red quantum dot compensation coefficient RQDCC and the green quantum dot compensation coefficient GQDCC, and outputs the second compensation image data CDATA2. The second compensation image data CDATA2 may include the second compensation red data CR2, the second compensation green data CG2 and the second compensation blue data CB2. Specifically, the quantum dot compensating part 240 may multiply the first compensation red data CR1 by the red quantum dot compensation coefficient RQDCC, and may output the second compensation red data CR2. In addition, the quantum dot compensating part 240 may multiply the first compensation green data CG1 by the green quantum dot compensation coefficient GQDCC, and may output the second compensation green data CG2. In addition, the quantum dot compensating part 240 may output the first compensation blue data CB1 as the second compensation blue data CB2. Thus, the second compensation blue data CB2 may be substantially the same as the first compensation blue data CB1.

The data signal DS is generated using the second compensation image data CDATA2 and the data signal DS is output to the data line DL (operation S160). Specifically, the data driving part 140 receives the second compensation image data CDATA2 from the timing controlling part 150, generates the data signal DS using the second compensation image data CDATA2, and outputs the data signal DS to the data line DL in response to the horizontal start signal STH and the second clock signal CLK2 provided from the timing controlling part 150. The data driving part 140 may include the data driving ICs 141 generating the data signal DS and outputting the data signal DS to the data line DL.

The gate signal GS is output to the gate line GL (operation S170). Specifically, the gate driving part 130 generates the gate signals GS in response to the vertical start signal STV and the first clock signal CLK1 provided from the timing controlling part 150, and outputs the gate signals GS to the gate lines GL, respectively. The gate driving part 130 may receive the gate on voltage Vgon and the gate off voltage Vgoff from the voltage generating part 160, and may generate the gate signal GS using the gate on voltage Vgon and the gate off voltage Vgoff.

According to the illustrated exemplary embodiment, the luminance decrease of the display panel 110 by the red quantum dot layer 421 may be compensated using the red quantum dot compensation coefficient RQDCC and the luminance decrease of the display panel 110 by the green quantum dot layer 422 may be compensated using the green quantum dot compensation coefficient GQDCC. Therefore, luminance of the first sub pixel area SPA1 in which the red quantum dot layer 421 is disposed, the second sub pixel area SPA2 in which the green quantum dot layer 422 is disposed, and the third sub pixel area SPA3 in which the transparent layer 423 is disposed may be equalized. Thus, display quality of the display apparatus 100 may be improved.

Figure 8:
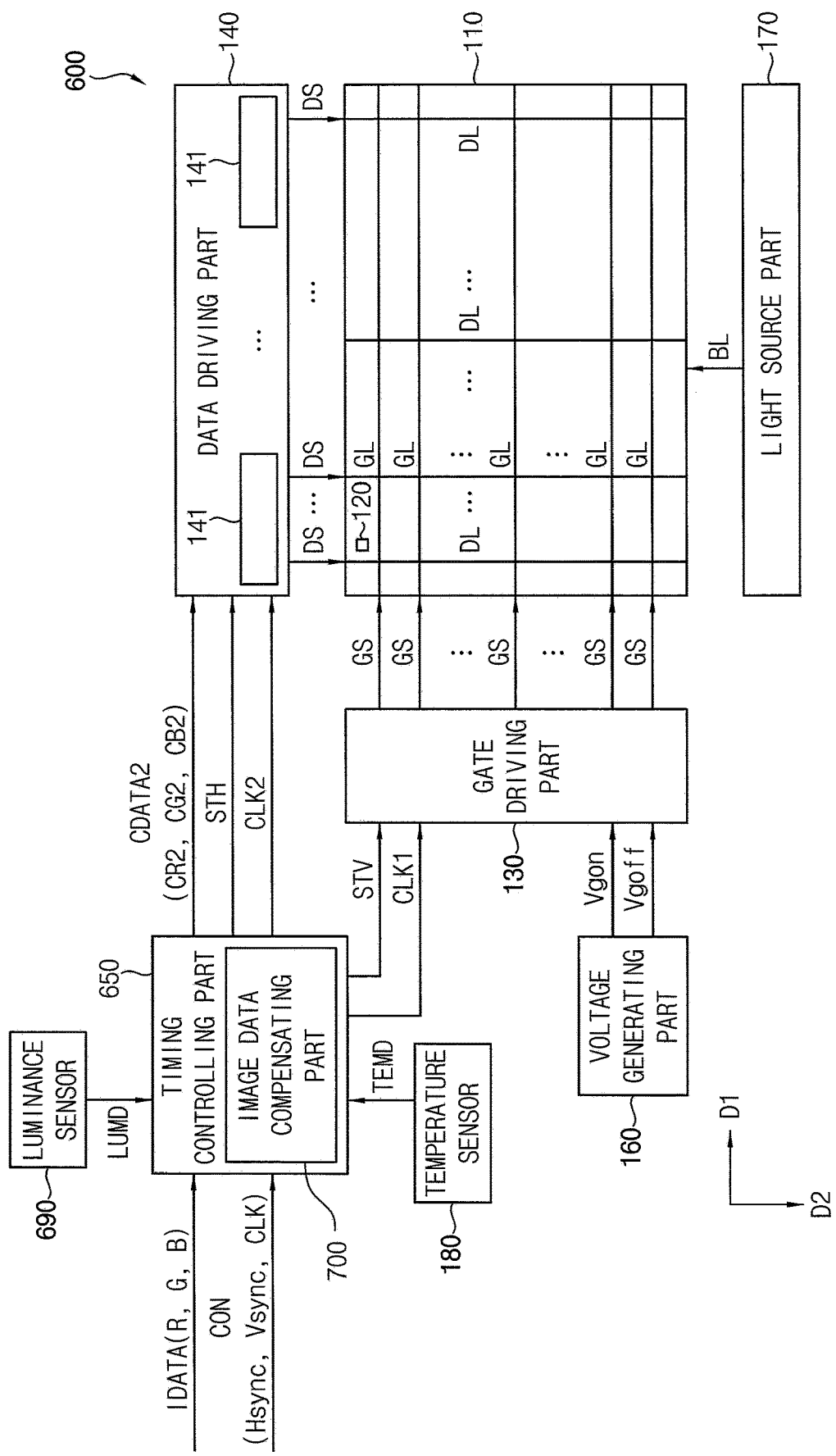
FIG. 8 is a block diagram illustrating a display apparatus according to an exemplary embodiment of the invention.

FIG. 8 is a block diagram illustrating a display apparatus according to an exemplary embodiment of the invention.

The display apparatus 600 according to the illustrated exemplary embodiment illustrated in FIG. 8 may be substantially the same as the display apparatus 100 according to the previous exemplary embodiment illustrated in FIG. 1 except for a timing controlling part 650, an image data compensating part 700 and a luminance sensor 690. Thus, the same reference numerals will be used to refer to same or like parts as those described in the previous exemplary embodiment and any further repetitive explanation concerning the above elements will be omitted.

Referring to FIG. 8, the display apparatus 600 according to the illustrated exemplary embodiment includes the display panel 110, the gate driving part 130, the data driving part 140, the timing controlling part 650, the voltage generating part 160, the light source part 170, the temperature sensor 180 and the luminance sensor 690.

The gate driving part 130, the data driving part 140 and the timing controlling part 650 may be defined as a display panel driving apparatus for driving the display panel 110.

The gate driving part 130 generates the gate signals GS in response to the vertical start signal STV and the first clock signal CLK1 provided from the timing controlling part 650, and outputs the gate signals GS to the gate lines GL, respectively.

The data driving part 140 receives second compensation image data CDATA2 from the timing controlling part 650, generates the data signal DS using the second compensation image data CDATA2, and outputs the data signal DS to the data line DL in response to the horizontal start signal STH and the second clock signal CLK2 provided from the timing controlling part 650.

The timing controlling part 650 receives the input image data IDATA and the control signal CON from an outside. The input image data IDATA may include the red data R, the green data G and the blue data B. The control signal CON may include the horizontal synchronous signal Hsync, the vertical synchronous signal Vsync and the clock signal CLK.

The timing controlling part 650 generates the horizontal start signal STH using the horizontal synchronous signal Hsync and outputs the horizontal start signal STH to the data driving part 140. In addition, the timing controlling part 650 generates the vertical start signal STV using the vertical synchronous signal Vsync and outputs the vertical start signal STV to the gate driving part 130. In addition, the timing controlling part 650 generates the first clock signal CLK1 and the second clock signal CLK2 using the clock signal CLK, outputs the first clock signal CLK1 to the gate driving part 130, and outputs the second clock signal CLK2 to the data driving part 140.

The timing controlling part 650 includes the image data compensating part 700. The image data compensating part 700 compensates for the input image data IDATA according to the temperature of the display panel 110, and the efficiency and life expectancy of the quantum dot included in the display panel 110, and outputs the second compensation image data CDATA2.

The temperature sensor 180 senses the temperature of the display panel 110. The temperature sensor 180 outputs the temperature data TEMD indicating the temperature of the display panel 110 to the timing controlling part 650.

The luminance sensor 690 senses the luminance of the display panel 110. The luminance sensor 690 outputs luminance data LUMD indicating the luminance of the display panel 110 to the timing controlling part 650.

Figure 9:
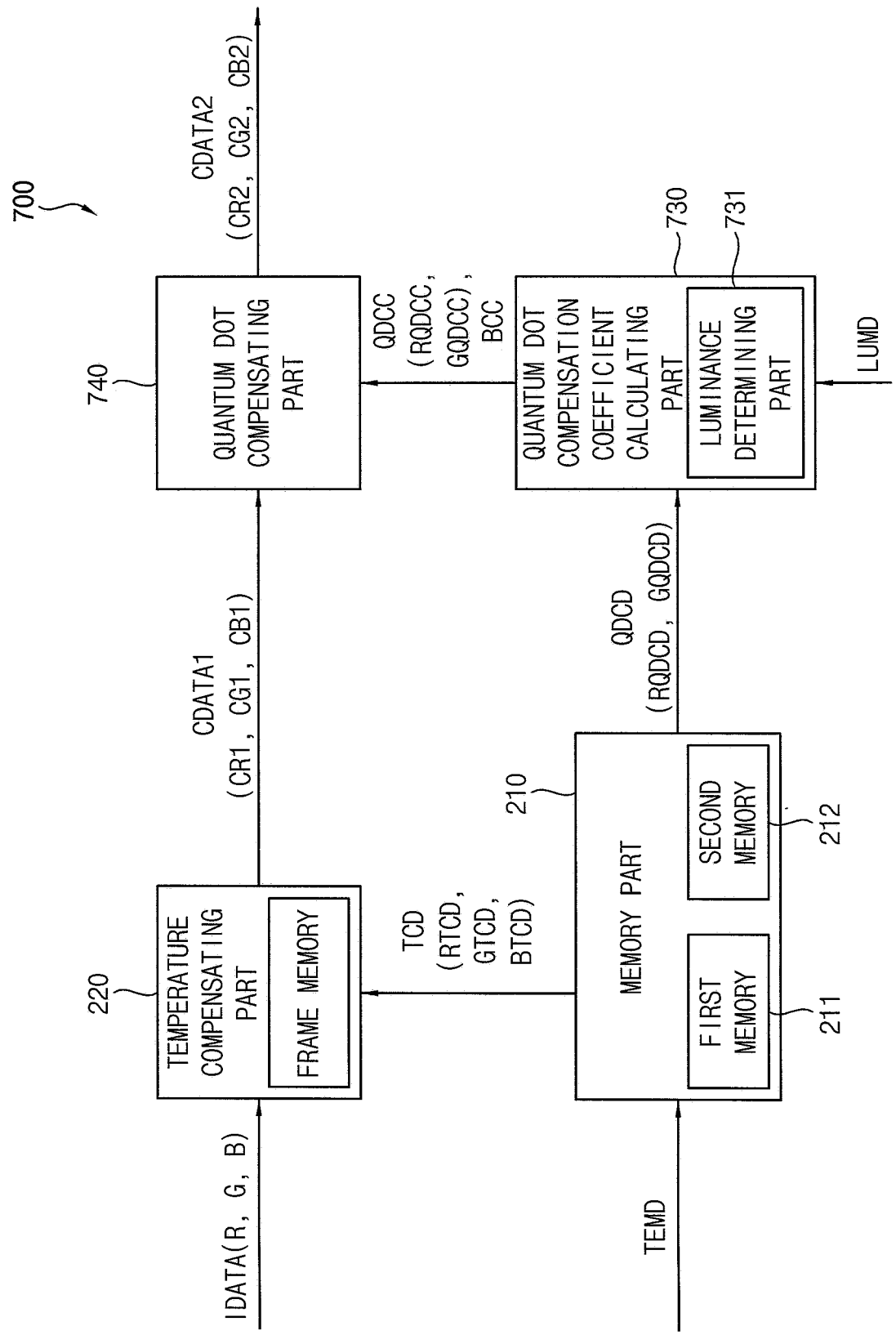
FIG. 9 is a block diagram illustrating an image data compensating part of FIG. 8.

FIG. 9 is a block diagram illustrating the image data compensating part 700 of FIG. 8.

Referring to FIGS. 3, 8 and 9, the image data compensating part 700 includes the memory part 210, the temperature compensating part 220, a quantum dot compensation coefficient calculating part 730 and a quantum dot compensating part 740.

The memory part 210 includes the first memory 211 and the second memory 212.

The first memory 211 stores and outputs the temperature compensation data TCD according to the temperature of the display panel 110. The temperature compensation data TCD may be the difference value between the target luminance of the display panel 110 and the real luminance of the display panel 110 according to the temperature of the display panel 110. Specifically, the temperature compensation data TCD may be the data for compensating for the real luminance of the display panel 110 according to the temperature of the display panel 110 to the target luminance of the display panel 110. The temperature compensation data TCD may include the red temperature compensation data RTCD, the green temperature compensation data GTCD and the blue temperature compensation data BTCD.

The memory part 210 may receive the temperature data TEMD. The memory part 210 may output, to the temperature compensating part 220, the temperature compensation data TCD according to the temperature of the display panel 110 indicated by the temperature data TEMD.

The second memory 212 stores and outputs the quantum dot compensation data QDCD according to the efficiency and life expectancy of the quantum dot in the quantum dot layer 420.

The efficiency and life expectancy of the red quantum dot in the red quantum dot layer 421 and the efficiency and life expectancy of the green quantum dot in the green quantum dot layer 422 decrease according to the increase of the driving time of the display panel 110. When the efficiency and life expectancy of the red quantum dot and the efficiency and life expectancy of the green quantum dot decrease, the real luminance of the display panel 110 decreases.

The quantum dot compensation data QDCD may be the difference value between the target luminance of the display panel 110 and the real luminance of the display panel 110 according to the efficiency and life expectancy of the quantum dot. Specifically, the quantum dot compensation data QDCD may be the data for compensating for the real luminance of the display panel 110 according to the efficiency and life expectancy of the quantum dot to the target luminance of the display panel 110.

Since the display panel 110 includes the red quantum dot layer 421 and the green quantum dot layer 422, the quantum dot compensation data QDCD may include the red quantum dot compensation data RQDCD according to the efficiency and life expectancy of the red quantum dot, and the green quantum dot compensation data GQDCD according to the efficiency and life expectancy of the green quantum dot.

The temperature compensating part 220 receives the input image data IDATA. The input image data IDATA may include the red data R, the green data G and the blue data B. The temperature compensating part 220 may include the frame memory for storing the input image data IDATA.

The temperature compensating part 220 compensates for the input image data IDATA using the temperature compensation data TCD and outputs the first compensation image data CDATA1. The first compensation image data CDATA1 may include the first compensation red data CR1, the first compensation green data CG1 and the first compensation blue data CB1. Specifically, the temperature compensating part 220 applies the red temperature compensation data RTCD to the red data R and outputs the first compensation red data CR1. In addition, the temperature compensating part 220 applies the green temperature compensation data GTCD to the green data G and outputs the first compensation green data CG1. In addition, the temperature compensating part 220 applies the blue temperature compensation data BTCD to the blue data B and outputs the first compensation blue data CB1.

According to another exemplary embodiment, the temperature compensating part 220 may receive the temperature data TEMD. In this case, the temperature compensating part 220 may read, from the first memory 211 of the memory part 210, the temperature compensation data TCD according to the temperature of the display panel 110 indicted by the temperature data TEMD, may compensate for the input image data IDATA, and may output the first compensation image data CDATA1.

The quantum dot compensation coefficient calculating part 730 receives the quantum dot compensation data QDCD and outputs the quantum dot compensation coefficient QDCC. In an exemplary embodiment, the quantum dot compensation data QDCD may be transferred from the memory part 210 to the quantum dot compensation coefficient calculating part 730 through an I2C communication, for example.

The quantum dot compensation coefficient calculating part 730 receives the red quantum dot compensation data RQDCD and outputs the red quantum dot compensation coefficient RQDCC. In addition, the quantum dot compensation coefficient calculating part 730 receives the green quantum dot compensation data GQDCD and outputs the green quantum dot compensation coefficient GQDCC. The red quantum dot compensation coefficient RQDCC may be the coefficient for compensating for the real luminance of the display panel 110 which is decreased by the efficiency and life expectancy of the red quantum dot in the red quantum dot layer 421 to the target luminance of the display panel 110. The green quantum dot compensation coefficient GQDCC may be the coefficient for compensating for the real luminance of the display panel 110 which is decreased by the efficiency and life expectancy of the green quantum dot in the green quantum dot layer 422 to the target luminance of the display panel 110.

The quantum dot compensation coefficient calculating part 730 may calculate the red quantum dot compensation coefficient RQDCC by determining the efficiency and life expectancy of the red quantum dot in the red quantum dot layer 421 based on the driving time of the display panel 110. In addition, the quantum dot compensation coefficient calculating part 730 may calculate the green quantum dot compensation coefficient GQDCC by determining the efficiency and life expectancy of the green quantum dot in the green quantum dot layer 422 based on the driving time of the display panel 110.

The quantum dot compensation coefficient calculating part 730 includes a luminance determining part 731. The luminance determining part 731 receives the luminance data LUMD and determines the luminance of the display panel 110. Specifically, the luminance determining part 731 determines whether the luminance of the display panel 110 is not greater than a reference luminance.

When the luminance of the display panel 110 is not greater than the reference luminance, the quantum dot compensation coefficient calculating part 730 further outputs a blue compensation coefficient BCC. The blue compensation coefficient BCC may be a coefficient for a white balance of the red displayed in the first sub pixel area SPA1, the green displayed in the second sub pixel area SPA2 and the blue displayed in the third sub pixel area SPA3.

When the luminance of the display panel 110 is greater than the reference luminance, the quantum dot compensating part 740 compensates for the first compensation image data CDATA1 using the red quantum dot compensation coefficient RQDCC and the green quantum dot compensation coefficient GQDCC, and outputs the second compensation image data CDATA2. The second compensation image data CDATA2 may include the second compensation red data CR2, the second compensation green data CG2 and the second compensation blue data CB2. Specifically, the quantum dot compensating part 740 may multiply the first compensation red data CR1 by the red quantum dot compensation coefficient RQDCC, and may output the second compensation red data CR2. In addition, the quantum dot compensating part 740 may multiply the first compensation green data CG1 by the green quantum dot compensation coefficient GQDCC, and may output the second compensation green data CG2. In addition, the quantum dot compensating part 740 may output the first compensation blue data CB1 as the second compensation blue data CB2. Thus, the second compensation blue data CB2 may be substantially the same as the first compensation blue data CB1.

When the luminance of the display panel 110 is not greater than the reference luminance, the quantum dot compensating part 740 compensates for the first compensation image data CDATA1 using the red quantum dot compensation coefficient RQDCC, the green quantum dot compensation coefficient GQDCC and the blue compensation coefficient BCC, and outputs the second compensation image data CDATA2. The second compensation image data CDATA2 may include the second compensation red data CR2, the second compensation green data CG2 and the second compensation blue data CB2. Specifically, the quantum dot compensating part 740 may multiply the first compensation red data CR1 by the red quantum dot compensation coefficient RQDCC, and may output the second compensation red data CR2. In addition, the quantum dot compensating part 740 may multiply the first compensation green data CG1 by the green quantum dot compensation coefficient GQDCC, and may output the second compensation green data CG2. In addition, the quantum dot compensating part 740 may multiply the first compensation blue data CB1 by the blue compensation coefficient BCC, and may output the second compensation blue data CB2.

Figure 10:
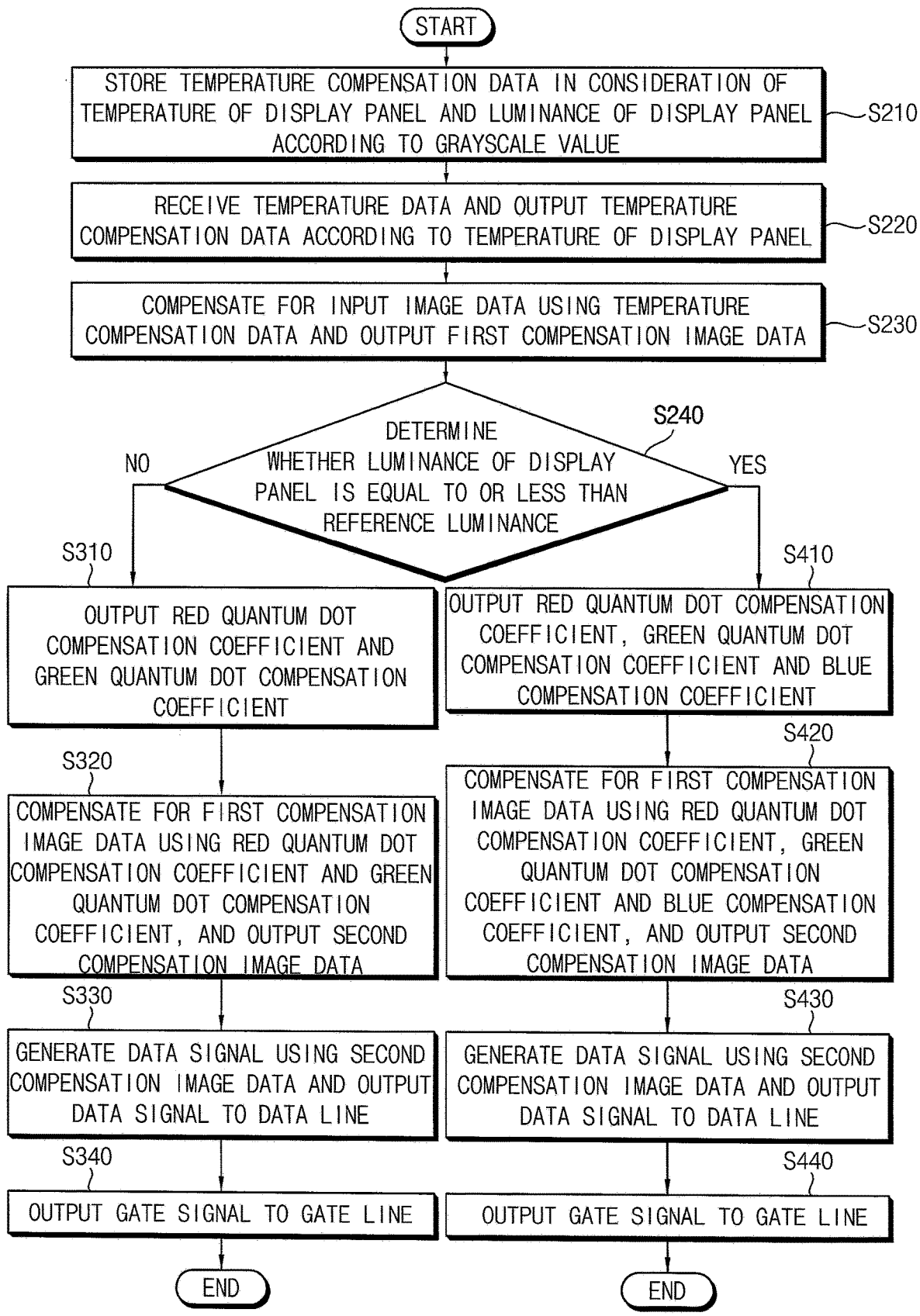
FIG. 10 is a flowchart illustrating a method of driving the display apparatus of FIG. 8.

FIG. 10 is a flowchart illustrating a method of driving the display apparatus 600 of FIG. 8.

Referring to FIGS. 3 and 8 to 10, the temperature compensation data TCD is stored in consideration of the luminance of the display panel 110 according to the temperature and the grayscale of the display panel 110 (operation S210).

Specifically, the first memory 211 stores and outputs the temperature compensation data TCD according to the temperature of the display panel 110. The temperature compensation data TCD may be the difference value between the target luminance of the display panel 110 and the real luminance of the display panel 110 according to the temperature of the display panel 110. The temperature compensation data TCD may be the data for compensating for the real luminance of the display panel 110 according to the temperature of the display panel 110 to the target luminance of the display panel 110.

In order to calculate the real luminance of the display panel 110 according to the temperature of the display panel 110, the luminance values of the red pixel, the green pixel and the blue pixel are measured with respect to the P (P is an integer) temperature. In addition, the luminance values of the red pixel, the green pixel and the blue pixel are measured with respect to the Q (Q is a natural number) grayscale value. In an exemplary embodiment, the luminance values of the red pixel, the green pixel and the blue pixel may be measured with respect to about −20 degrees to about 120 degrees in the interval of about 10 degrees, for example. In an exemplary embodiment, the luminance values of the red pixel, the green pixel and the blue pixel may be measured with respect to about 32 grayscale value to about 1024 grayscale value in the interval of 32 grayscale value, for example. Here, the red pixel corresponds to the first sub pixel area SPA1 in which the red quantum dot layer 421 is disposed, the green pixel corresponds to the second sub pixel area SPA2 in which the green quantum dot layer 422 is disposed, the blue pixel corresponds to the third sub pixel area SPA3 in which the transparent layer 423 is disposed.

Thus, the temperature compensation data TCD may include the red temperature compensation data RTCD, the green temperature compensation data GTCD and the blue temperature compensation data BTCD.

The temperature data TEMD is received and the temperature compensation data TCD according to the temperature of the display panel 110 is output (operation S220). Specifically, the memory part 210 may receive the temperature data TEMD. The memory part 210 may output, to the temperature compensating part 220, the temperature compensation data TCD according to the temperature of the display panel 110 indicated by the temperature data TEMD.

The input image data IDATA is compensated using the temperature compensation data TCD and the first compensation image data CDATA1 is output (operation S230).

Specifically, the temperature compensating part 220 receives the input image data IDATA. The input image data IDATA may include the red data R, the green data G and the blue data B. The temperature compensating part 220 may include the frame memory for storing the input image data IDATA.

The temperature compensating part 220 compensates for the input image data IDATA using the temperature compensation data TCD and outputs the first compensation image data CDATA1. The first compensation image data CDATA1 may include the first compensation red data CR1, the first compensation green data CG1 and the first compensation blue data CB1. Specifically, the temperature compensating part 220 applies the red temperature compensation data RTCD to the red data R and outputs the first compensation red data CR1. In addition, the temperature compensating part 220 applies the green temperature compensation data GTCD to the green data G and outputs the first compensation green data CG1. In addition, the temperature compensating part 220 applies the blue temperature compensation data BTCD to the blue data B and outputs the first compensation blue data CB1.

According to another exemplary embodiment, the temperature compensating part 220 may receive the temperature data TEMD. In this case, the temperature compensating part 220 may read, from the first memory 211 of the memory part 210, the temperature compensation data TCD according to the temperature of the display panel 110 indicted by the temperature data TEMD, may compensate for the input image data IDATA, and may output the first compensation image data CDATA1.

The luminance of the display panel 110 is determined whether the luminance of the display panel 110 is not greater than the reference luminance (i.e., whether the luminance of the display panel 110 is equal to or less than the reference luminance) (operation S240). Specifically, the quantum dot compensation coefficient calculating part 730 includes the luminance determining part 731. The luminance determining part receives the luminance data LUMD and determines the luminance of the display panel 110. Specifically, the luminance determining part 731 determines whether the luminance of the display panel 110 is not greater than the reference luminance (i.e., whether the luminance of the display panel 110 is equal to or less than the reference luminance).

When the luminance of the display panel 110 is greater than the reference luminance (i.e., when the luminance of the display panel 110 is not equal to or less than the reference luminance), the red quantum dot compensation coefficient RQDCC and the green quantum dot compensation coefficient GQDCC are output (operation S310).

Specifically, the quantum dot compensation coefficient calculating part 730 receives the quantum dot compensation data QDCD and outputs the quantum dot compensation coefficient QDCC. In an exemplary embodiment, the quantum dot compensation data QDCD may be transferred from the memory part 210 to the quantum dot compensation coefficient calculating part 730 through an I2C communication, for example.

The quantum dot compensation coefficient calculating part 730 receives the red quantum dot compensation data RQDCD and outputs the red quantum dot compensation coefficient RQDCC. In addition, the quantum dot compensation coefficient calculating part 730 receives the green quantum dot compensation data GQDCD and outputs the green quantum dot compensation coefficient GQDCC. The red quantum dot compensation coefficient RQDCC may be the coefficient for compensating for the real luminance of the display panel 110 which is decreased by the efficiency and life expectancy of the red quantum dot in the red quantum dot layer 421 to the target luminance of the display panel 110. The green quantum dot compensation coefficient GQDCC may be the coefficient for compensating for the real luminance of the display panel 110 which is decreased by the efficiency and life expectancy of the green quantum dot in the green quantum dot layer 422 to the target luminance of the display panel 110.

The quantum dot compensation coefficient calculating part 730 may calculate the red quantum dot compensation coefficient RQDCC by determining the efficiency and life expectancy of the red quantum dot in the red quantum dot layer 421 based on the driving time of the display panel 110. In addition, the quantum dot compensation coefficient calculating part 730 may calculate the green quantum dot compensation coefficient GQDCC by determining the efficiency and life expectancy of the green quantum dot in the green quantum dot layer 422 based on the driving time of the display panel 110.

The first compensation image data CDATA1 is compensated using the red quantum dot compensation coefficient RQDCC and the green quantum dot compensation coefficient GQDCC, and the second compensation image data CDATA2 is output (operation S320). Specifically, the quantum dot compensating part 740 compensates for the first compensation image data CDATA1 using the red quantum dot compensation coefficient RQDCC and the green quantum dot compensation coefficient GQDCC, and outputs the second compensation image data CDATA2. The second compensation image data CDATA2 may include the second compensation red data CR2, the second compensation green data CG2 and the second compensation blue data CB2. Specifically, the quantum dot compensating part 740 may multiply the first compensation red data CR1 by the red quantum dot compensation coefficient RQDCC, and may output the second compensation red data CR2. In addition, the quantum dot compensating part 740 may multiply the first compensation green data CG1 by the green quantum dot compensation coefficient GQDCC, and may output the second compensation green data CG2. In addition, the quantum dot compensating part 740 may output the first compensation blue data CB1 as the second compensation blue data CB2. Thus, the second compensation blue data CB2 may be substantially the same as the first compensation blue data CB1.

The data signal DS is generated using the second compensation image data CDATA2 and the data signal DS is output to the data line DL (operation S330). Specifically, the data driving part 140 receives the second compensation image data CDATA2 from the timing controlling part 650, generates the data signal DS using the second compensation image data CDATA2, and outputs the data signal DS to the data line DL in response to the horizontal start signal STH and the second clock signal CLK2 provided from the timing controlling part 650. The data driving part 140 may include the data driving ICs 141 generating the data signal DS and outputting the data signal DS to the data line DL.

The gate signal GS is output to the gate line GL (operation S340). Specifically, the gate driving part 130 generates the gate signals GS in response to the vertical start signal STV and the first clock signal CLK1 provided from the timing controlling part 650, and outputs the gate signals GS to the gate lines GL, respectively. The gate driving part 130 may receive the gate on voltage Vgon and the gate off voltage Vgoff from the voltage generating part 160, and may generate the gate signal GS using the gate on voltage Vgon and the gate off voltage Vgoff.

When the luminance of the display panel 110 is not greater than the reference luminance (i.e., when the luminance of the display panel 110 is equal to or less than the reference luminance), the red quantum dot compensation coefficient RQDCC, the green quantum dot compensation coefficient GQDCC and the blue compensation coefficient BCC are output (operation S410).

Specifically, the quantum dot compensation coefficient calculating part 730 receives the quantum dot compensation data QDCD and outputs the quantum dot compensation coefficient QDCC. In an exemplary embodiment, the quantum dot compensation data QDCD may be transferred from the memory part 210 to the quantum dot compensation coefficient calculating part 730 through an I2C communication, for example.

The quantum dot compensation coefficient calculating part 730 receives the red quantum dot compensation data RQDCD and outputs the red quantum dot compensation coefficient RQDCC. In addition, the quantum dot compensation coefficient calculating part 730 receives the green quantum dot compensation data GQDCD and outputs the green quantum dot compensation coefficient GQDCC. The red quantum dot compensation coefficient RQDCC may be the coefficient for compensating for the real luminance of the display panel 110 which is decreased by the efficiency and life expectancy of the red quantum dot in the red quantum dot layer 421 to the target luminance of the display panel 110. The green quantum dot compensation coefficient GQDCC may be the coefficient for compensating for the real luminance of the display panel 110 which is decreased by the efficiency and life expectancy of the green quantum dot in the green quantum dot layer 422 to the target luminance of the display panel 110.

The quantum dot compensation coefficient calculating part 730 may calculate the red quantum dot compensation coefficient RQDCC by determining the efficiency and life expectancy of the red quantum dot in the red quantum dot layer 421 based on the driving time of the display panel 110. In addition, the quantum dot compensation coefficient calculating part 730 may calculate the green quantum dot compensation coefficient GQDCC by determining the efficiency and life expectancy of the green quantum dot in the green quantum dot layer 422 based on the driving time of the display panel 110.

The quantum dot compensation coefficient calculating part 730 further outputs the blue compensation coefficient BCC. The blue compensation coefficient BCC may be the coefficient for a white balance of the red displayed in the first sub pixel area SPA1, the green displayed in the second sub pixel area SPA2 and the blue displayed in the third sub pixel area SPA3.

The first compensation image data CDATA1 is compensated using the red quantum dot compensation coefficient RQDCC, the green quantum dot compensation coefficient GQDCC and the blue compensation coefficient BCC, and the second compensation image data CDATA2 is output (operation S420). Specifically, the quantum dot compensating part 740 compensates for the first compensation image data CDATA1 using the red quantum dot compensation coefficient RQDCC, the green quantum dot compensation coefficient GQDCC and the blue compensation coefficient BCC, and outputs the second compensation image data CDATA2. The second compensation image data CDATA2 may include the second compensation red data CR2, the second compensation green data CG2 and the second compensation blue data CB2. Specifically, the quantum dot compensating part 740 may multiply the first compensation red data CR1 by the red quantum dot compensation coefficient RQDCC, and may output the second compensation red data CR2. In addition, the quantum dot compensating part 740 may multiply the first compensation green data CG1 by the green quantum dot compensation coefficient GQDCC, and may output the second compensation green data CG2. In addition, the quantum dot compensating part 740 may multiply the first compensation blue data CB1 by the blue compensation coefficient BCC, and may output the second compensation blue data CB2.

The data signal DS is generated using the second compensation image data CDATA2 and the data signal DS is output to the data line DL (operation S430). Specifically, the data driving part 140 receives the second compensation image data CDATA2 from the timing controlling part 650, generates the data signal DS using the second compensation image data CDATA2, and outputs the data signal DS to the data line DL in response to the horizontal start signal STH and the second clock signal CLK2 provided from the timing controlling part 650. The data driving part 140 may include the data driving ICs 141 generating the data signal DS and outputting the data signal DS to the data line DL.

The gate signal GS is output to the gate line GL (operation S440). Specifically, the gate driving part 130 generates the gate signals GS in response to the vertical start signal STV and the first clock signal CLK1 provided from the timing controlling part 650, and outputs the gate signals GS to the gate lines GL, respectively. The gate driving part 130 may receive the gate on voltage Vgon and the gate off voltage Vgoff from the voltage generating part 160, and may generate the gate signal GS using the gate on voltage Vgon and the gate off voltage Vgoff.

According to the illustrated exemplary embodiment, the luminance decrease of the display panel 110 by the red quantum dot layer 421 may be compensated using the red quantum dot compensation coefficient RQDCC and the luminance decrease of the display panel 110 by the green quantum dot layer 422 may be compensated using the green quantum dot compensation coefficient GQDCC. Therefore, luminance of the first sub pixel area SPA1 in which the red quantum dot layer 421 is disposed, the second sub pixel area SPA2 in which the green quantum dot layer 422 is disposed, and the third sub pixel area SPA3 in which the transparent layer 423 is disposed may be equalized. In addition, the white balance of the red displayed in the first sub pixel area SPA1, the green displayed in the second sub pixel area SPA2 and the blue displayed in the third sub pixel area SPA3 may be adjusted. Thus, display quality of the display apparatus 600 may be improved.

The invention may be applied to an electronic device having a display apparatus. In an exemplary embodiment, the invention may be applied to various electronic devices such as a television, a computer monitor, a laptop, a digital camera, a cellular phone, a smart phone, a tablet personal computer ("PC"), a smart pad, a personal digital assistant ("PDA"), a portable multimedia player ("PMP"), an MP3 player, a navigation system, a camcorder, a portable game console, etc.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses, if provided, are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
    a display panel which displays an image, and comprises a quantum dot, a gate line and a data line;
    a gate driver which outputs a gate signal to the gate line of the display panel;
    an image data compensator which receives input image data, compensates for the input image data according to a temperature of the display panel, outputs first compensation image data in order to compensate for a luminance decrease of the display panel according to the temperature of the display panel, and compensates for the first compensation image data according to an efficiency and a life expectancy of the quantum dot to output second compensation image data in order to compensate for a luminance decrease of the display panel by the quantum dot; and
    a data driver which generates a data signal using the second compensation image data, and outputs the data signal to the data line of the display panel.

2. The display apparatus of claim 1, wherein the image data compensator comprises a first memory which stores temperature compensation data according to the temperature of the display panel.

3. The display apparatus of claim 2, wherein the image data compensator further comprises a second memory which stores a quantum dot compensation coefficient according to the efficiency and the life expectancy of the quantum dot.

4. The display apparatus of claim 3, wherein the image data compensator further comprises a temperature compensating part which receives the input image data, compensates for the input image data using the temperature compensation data, and outputs the first compensation image data.

5. The display apparatus of claim 4, wherein the image data compensator further comprises a quantum dot compensating part which receives the first compensation image data, compensates for the first compensation image data using the quantum dot compensation coefficient, and outputs the second compensation image data.

6. The display apparatus of claim 5, wherein the quantum dot compensation coefficient comprises a red quantum dot compensation coefficient according to a life expectancy and an efficiency of a red quantum dot, and a green quantum dot compensation coefficient according to a life expectancy and an efficiency of a green quantum dot.

7. The display apparatus of claim 6, wherein the input image data comprises red data, green data and blue data,
    the first compensation image data comprises first compensation red data, first compensation green data and first compensation blue data, and
    the quantum dot compensating part multiplies the first compensation red data by the red quantum dot compensation coefficient to output second compensation red data of the second compensation image data, and multiplies the first compensation green data by the green quantum dot compensation coefficient to output second compensation green data of the second compensation image data.

8. The display apparatus of claim 7, wherein second compensation blue data of the second compensation image data is the same as the first compensation blue data of the first compensation image data.

9. The display apparatus of claim 5, wherein the quantum dot compensating part compensates for the first compensation image data further using a blue compensation coefficient to output the second compensation image data.

10. The display apparatus of claim 9, wherein
    the quantum dot compensation coefficient comprises a red quantum dot compensation coefficient according to a life expectancy and an efficiency of a red quantum dot, and a green quantum dot compensation coefficient according to a life expectancy and an efficiency of a green quantum dot,
    the input image data comprises red data, green data and blue data,
    the first compensation image data comprises first compensation red data, first compensation green data and first compensation blue data, and
    when the luminance of the display panel is not greater than a reference luminance, the quantum dot compensating part multiplies the first compensation red data by the red quantum dot compensation coefficient to output second compensation red data of the second compensation image data, multiplies the first compensation green data by the green quantum dot compensation coefficient to output second compensation green data of the second compensation image data and multiplies the first compensation blue data by the blue compensation coefficient to output second compensation blue data of the second compensation image data.

11. The display apparatus of claim 1, further comprising: a temperature sensor which senses the temperature of the display panel.

12. The display apparatus of claim 11, wherein the temperature sensor contacts a rear surface of the display panel.

13. The display apparatus of claim 12, further comprising:
a first printed circuit board on which the temperature sensor is disposed; and
a second printed circuit board which is connected between the display panel and the first printed circuit board, and is a flexible printed circuit board,
wherein a data driving integrated circuit of the data driver is disposed on the second printed circuit board.

14. The display apparatus of claim 1, wherein the display panel comprises:
a lower substrate comprising a first base substrate including a first sub pixel area, a second sub pixel area and a third sub pixel area, a thin film transistor disposed on the first base substrate and including a gate electrode, a source electrode and a drain electrode, and a pixel electrode electrically connected to the drain electrode of the thin film transistor;
an upper substrate comprising a second base substrate facing the first base substrate, a quantum dot layer disposed on the second base substrate and including the quantum dot, and a common electrode disposed on the quantum dot layer; and
a liquid crystal layer interposed between the lower substrate and the upper substrate.

15. The display apparatus of claim 14, wherein the quantum dot layer comprises a red quantum dot layer disposed in the first sub pixel area, a green quantum dot layer disposed in the second sub pixel area, and a transparent layer disposed in the third sub pixel area.

16. The display apparatus of claim 15, further comprising:
a light source part which outputs a blue light to the display panel.

17. The display apparatus of claim 14, wherein the display panel further comprises:
a polarizing layer disposed on a rear surface of the first base substrate;
a transmitting and reflecting layer disposed on the quantum dot layer;
a planarizing layer disposed on the transmitting and reflecting layer; and
a wire grid pattern disposed on the planarizing layer and including a plurality of protrusion portions.

18. A method of driving a display apparatus, the method comprising:
compensating for input image data according to a temperature of a display panel to output first compensation image data in order to compensate for a luminance decrease of the display panel according to the temperature of the display panel, the display panel comprising a quantum dot, a gate line and a data line;
compensating for the first compensation image data according to an efficiency and a life expectancy of the quantum dot to output second compensation image data in order to compensate for a luminance decrease of the display panel by the quantum dot;
generating a data signal using the second compensation image data, and outputting the data signal to the data line of the display panel; and
outputting a gate signal to the gate line of the display panel.

19. The method of claim 18, wherein the compensating for the first compensation image data to output the second compensation image data comprises:
multiplying first compensation red data of the first compensation image data by red quantum dot compensation coefficient to output second compensation red data of the second compensation image data;
multiplying first compensation green data of the first compensation image data by green quantum dot compensation coefficient to output second compensation green data of the second compensation image data; and
outputting first compensation blue data of the first compensation image data as second compensation blue data of the second compensation image data.

20. The method of claim 18, wherein, when the luminance of the display panel is not greater than a reference luminance, the compensating for the first compensation image data to output the second compensation image data comprises:
multiplying first compensation red data of the first compensation image data by red quantum dot compensation coefficient to output second compensation red data of the second compensation image data;
multiplying first compensation green data of the first compensation image data by green quantum dot compensation coefficient to output second compensation green data of the second compensation image data; and
multiplying first compensation blue data of the first compensation image data by blue compensation coefficient to output second compensation blue data of the second compensation image data.

* * * * *